(12) United States Patent
Metcalfe et al.

(10) Patent No.: US 7,243,300 B1
(45) Date of Patent: Jul. 10, 2007

(54) AUTOMATED DOCUMENT PRODUCTION FROM A SEARCH ENVIRONMENT

(75) Inventors: James Robert Metcalfe, Killara (AU); John Stewart Reeves, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 09/615,781

(22) Filed: Jul. 13, 2000

(30) Foreign Application Priority Data

Jul. 14, 1999 (AU) ..................................... PQ1638

(51) Int. Cl.
*G06F 15/00* (2006.01)
*G06F 17/00* (2006.01)

(52) U.S. Cl. .................. 715/501.1; 715/500; 715/513; 707/3; 707/4; 707/5; 707/6

(58) Field of Classification Search ............. 715/501.1, 715/500, 513; 707/3–6
See application file for complete search history.

(56) References Cited

U.S. PATENT DOCUMENTS

| | | | |
|---|---|---|---|
| 6,169,986 B1 * | 1/2001 | Bowman et al. ................ | 707/5 |
| 6,269,361 B1 * | 7/2001 | Davis et al. .................... | 707/3 |
| 6,271,840 B1 * | 8/2001 | Finseth et al. ............. | 715/513 |
| 6,370,527 B1 * | 4/2002 | Singhal .......................... | 707/6 |
| 6,411,950 B1 * | 6/2002 | Moricz et al. ................. | 707/3 |
| 6,434,546 B1 * | 8/2002 | Williamowski et al. ....... | 707/3 |
| 6,484,162 B1 * | 11/2002 | Edlund et al. ................. | 707/3 |
| 6,490,579 B1 * | 12/2002 | Gao et al. ....................... | 707/4 |
| 6,539,377 B1 * | 3/2003 | Culliss ........................... | 707/5 |
| 6,567,800 B1 * | 5/2003 | Barrera et al. ................. | 707/3 |

FOREIGN PATENT DOCUMENTS

AU         199952600 B2    4/2000

WO         WO99/49396     9/1999

OTHER PUBLICATIONS

Ernst, Warren, Using Netscape, 1995 Que Corporation, pp. 56-57, 73-82.*
Oliver, Dick et al., Netscape 2 Unleashed, 1996 Sams.Net Publishing, pp. 26-27, 90-92.*
Shih-Fu Chang et al., Visual information retrieval from large distributed online repositories, Communications of the ACM, Dec. 1997, vol. 40, nIssue 12, pp. 63-71.*
Information located on the Internet at "http://www.google.com/legend.html" (Apr. 23, 1999).

* cited by examiner

*Primary Examiner*—William Bashore
(74) *Attorney, Agent, or Firm*—Fitzpatrick, Cella, Harper & Scinto

(57) ABSTRACT

A method of presenting search results (104) obtained from a search conducted over a computer network (720) is disclosed. The search is performed using searching criteria (102) and returns information including a plurality of network locations (106). Data is extracted (438) from a first one of the network locations and examined 442) to identify therein the searching criteria to provide at least one specific location (444) within the first network location of the searching criteria. The specific location is used to identify, from the extracted data, specific data (452) including at least the searching criteria. The specific data is then formatted a printable document (454). Preferably, the steps are repeated for each remaining network location in which the formatted data is incorporated into printable document. Typically, the formatted data spans at least one printable page thereby allowing identification of one or more locations (304) where the pages are void of formatted data. In such instances, further data (524) can be sourced from the computer network formatted and incorporated at least one void location within in the printable document.

35 Claims, 7 Drawing Sheets

US 7,243,300 B1

AUTOMATED DOCUMENT PRODUCTION FROM A SEARCH ENVIRONMENT

TECHNICAL FIELD OF THE INVENTION

The present invention relates generally to network-based browsing and searching applications and, in particular, to the preparation of printable documents that facilitate the rapid and discriminating review of search results obtained from such applications, and for providing advertising and like messages.

BACKGROUND ART

In order to facilitate the accessing of information available through computer networks such as the Internet and the World Wide Web ("the Web"), network service providers typically allow users access to one or mores search engines that are operable by the user to identify specific classes of information available on the network.

FIG. 1 depicts an example of the Web browser application and a typical presentation via a graphical user interface (GUI) of a search engine page 100 that may arise from a user searching of a particular keyword string of text 102, in this example STRING. STRING may be a single alphanumeric word, or a list of such words, perhaps linked by Boolean operators, and represents the search criteria used by the search engine. As illustrated in FIG. 1, search results 104 are typically ranked according to the quality of hit upon the searched string and typically lists a location 106 of the search result and the corresponding title 108. The actual presentation of the search results 104 is often user definable within a range of settings established by the search engine. Typically the location 106 of an individual result 114 is expressed as a Uniform Resource Location (URL). In some cases, the title 108 and the location 106 are combined as a Uniform Resource Indicator (URI). Often, the search engine application provides for some amount of text 110, typically a few lines or an abstract, relating to the particular location to be presented as part of the search result. In many search engines, this text typically represents the first few lines of text of the referenced location.

As a consequence, based on the presentation shown in FIG. 1, the user is then able to scroll through the search results 104 using a scroll bar 112 or by selecting different display pages of the search result to identify those individual results desired to be reviewed. In those circumstances where the user preselects the text 110 to be displayed, often the search results 104 are provided arranged ten to a page. However, removal of the text 110 can provide the search results to be provided at a rate of approximately twenty per page, where "page" in this fashion represents electronic page of information displayed on a display screen to the computer network user.

Many problems exist with the above described arrangement. Firstly, where only the URL 106 is presented in the result, often the user has no means of interpreting the search result other than by accessing the URL. Where the titles 108 are selected for display, often the particular title 108 provides no information as to the specific content, or context of that content, to be found at the corresponding URL, or bears any relationship to the searched string 102. Further, where the text 110 is also provided, there is no guarantee that the searched string 102 will be presented in the text displayed on the search page 100. Further, in any configuration there in no guarantee that when the user accesses the particular location 106, at which the searched string 102 is putported to be found, that the searched string will actually be found. As a consequence of the inadequacies of the information presented in the search page 100 shown in FIG. 1, users often spend excessive amounts of time accessing individual locations, reviewing the locations and, where appropriate, discarding the relevance of that location before referring to a further location.

FIG. 2A exemplifies a display of a Web page 200 accessed through a user selecting the first search result 114 shown in FIG. 1. As seen from FIG. 2A, the displayed Web page 200 includes a title banner 202, various images 204, 206, 208, 210, and text 212 incorporating the searched string 214. With such an example, accessing of the first search result 114 by the user provides an immediate result in response to the user's searching of the search string.

However, in FIG. 2B, a Web title page 230 for another search result 116 shown in FIG. 1 is shown which also includes a title 216, a certain amount of text 218, an animated GIF image 220 together with a number of further URL links 222 within the same primary location depicted by the particular URL, in this case URL#m. Notably, the search string is not seen in the displayed page 230 of FIG. 2B. In order for the user to find the search string, it is necessary for the user to scroll through the Web page 230 using the scroll bar 112. As seen from FIG. 2C, the search string 102 is located at 232 within a display screen 234 within the Web page 230 defined by the URL#m. The display screen 234 is seen to have images 224, 226 and text 228.

Further, where the user reviews information at any one location, the only convenient way of forming a reasonable record of that review is to print a particular page of the reference location. Print facilities provided with browser applications and search engine pages are limited to one Web page at a time. This requires the user to access each Web page and to then print that page where appropriate.

It will therefore be appreciated that traditional methods of viewing search results obtained over computer networks can be time consuming, and are not conducive to providing a convenient record of search results.

SUMMARY OF THE INVENTION

It is an object of the present invention to substantially overcome, or at least ameliorate, one or more disadvantages of existing arrangements.

In accordance with one aspect of the present invention there is disclosed a method of presenting search results obtained from a search conducted over a computer network, said search including searching criteria and returning information including a plurality of network locations, said method comprising the steps of:

(a) extracting data from a first said first network location;

(b) examining said data to identify therein said searching criteria to provide at least one specific location within said first network location of said searching criteria;

(c) using said one specific location to identify from said extracted data specific data including at least said searching criteria;

(d) formatting said specific data into a printable document; and (e) repeating steps (a) to (d) for each remaining said network location in which step (d) appends said formatted data of said remaining network location to said printable document.

In accordance with another aspect of the present invention there is disclosed a method of formatting an electronic document intended for reproduction by printing, said method comprising the steps of:

(a) sourcing main data from at least one location in a computer network, said data including a plurality of data types;

(b) formatting said data into a common data type suitable for each of electronic display and printing;

(c) arranging said formatted data as a printable document spanning at least one printable page;

(d) identifying one or more locations where said at least one page is void of said formatted data; and (e) sourcing further data configured in said common type and sized to be positioned within said one or more locations; and (f) formatting said further data within said one or more locations in said printable document.

In accordance with another aspect of the present invention there is disclosed a method of formatting an electronic document intended for reproduction by printing, said method comprising the steps of:

(a) obtaining from a searching process location information within a computer network of at least one search result returned by said searching process;

(b) using said location information to fetch data from said computer network relating to each said search result, said data including said searching criteria; and (c) formatting the fetched data including said searching criteria into a printable electronic document.

Apparatus and computer program products for performing each of the methods are also disclosed.

BRIEF DESCRIPTION OF THE DRAWINGS

A number of preferred embodiments of the present invention will now be described with reference to the drawings, in which.

DETAILED DESCRIPTION INCLUDING BEST MODE

To assist users in being able to track and trace their traversal of computer networks such as the Web, Canon Information Systems Research Australia Pty Ltd has developed a "Hypertext Document Collating Tool" which is currently the subject of U.S. patent application Ser. No. 08/903,743 filed 31 Jul. 1997. The Hypertext Document Collating Tool operates in a background mode behind the browsing software application used to traverse the Web, so as to automatically and transparently create a printable document that includes the various Web sites and documents encountered by the user during the traversal of the Web. The Web sites and documents typically include numerous data types, components and configurations, such as simple ASCII text, JPEG images, GIF and TIF static and animated graphics, and so on. Such varied source data is often termed "hypertext" and is formatted primarily for electronic representation via a display screen, but not necessarily for hard copy reproduction. Implementations of the Hypertext Document Collating Tool have been realised by the product marketed under the trade mark WebRecord™ by Canon Kabushiki Kaisha and Canon Information Systems Research Australia Pty Ltd.

The embodiments described in the present specification are preferably implemented as additional features to the Hypertext Document Collating Tool. The present invention however is not limited to user with the Hypertext Document Collating Tool, WebRecord™, or similar products, but has wider application and may for example be implemented in generic browsing software or searching arrangements, as will be appreciated by those skilled in the art having read and understood this specification.

Figure 1:
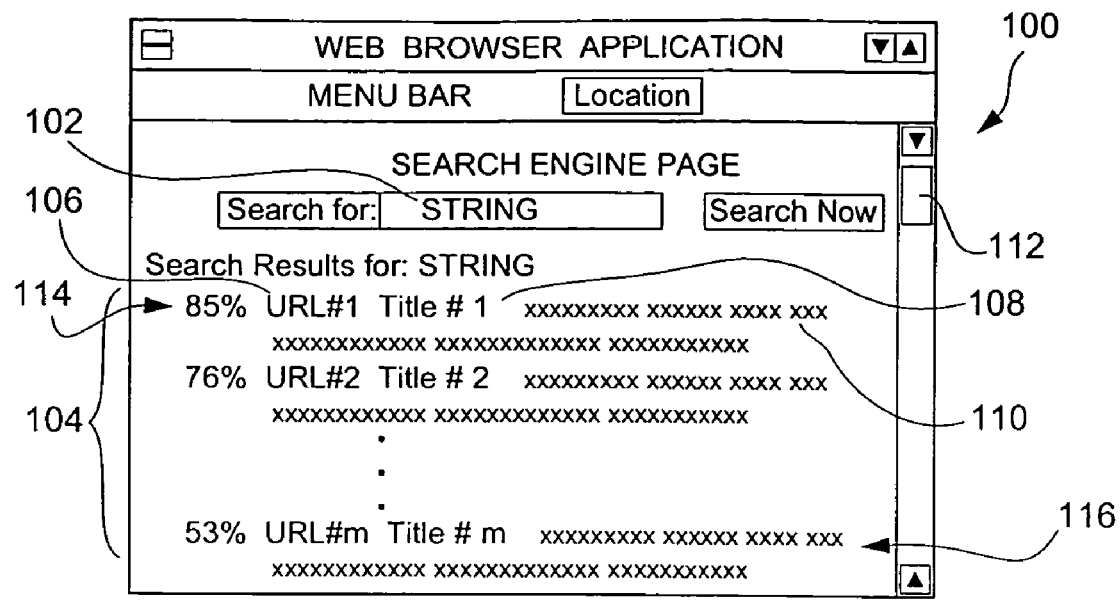
FIG. 1 shows an exemplary view of a typical search engine page as seen using a Web browser application.

The preferred embodiment provides an arrangement whereby the user, having conducted a search using traditional browsing software or search engines, such as described with reference to FIG. 1, is not required to individually examine each of the locations identified in the search result. According to the preferred embodiment, a further application, herein referred to as a formatted document generator application, operating in a manner akin to the aforementioned Hypertext Document Collating Tool, receives input information from the search engine result in the form of the searched keyword string and the individual URLs of each search result, and thereafter automatically generates a printable document formed of extracts from each search result, each extract incorporating information representing the context of the individual search result together with further information indicating the specific content incorporating the searched string. The input information may be provided directly from the search engine page 100, or alternatively via a file, for example pointed to by the search engine page 100, that contains the input information in a format interpretable by the formatted document generator application.

Figure 3:
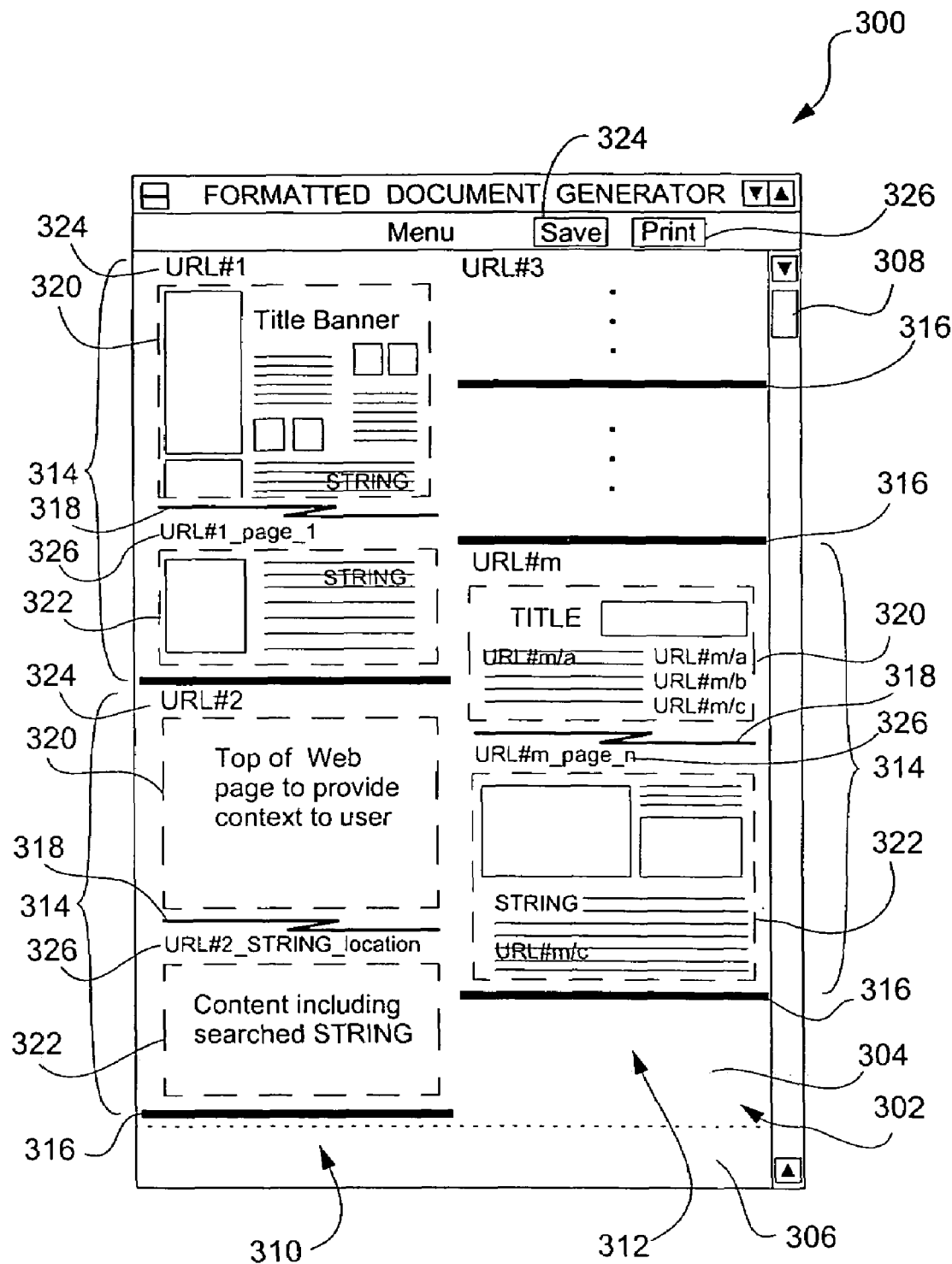
FIG. 3 is a schematic exemplary representation of a search result page according to the preferred embodiment based upon the search result of FIGS. 2A to 2C.

FIG. 3 shows a window 300 forming part of a graphical user interface presenting an electronic document 302 to the user. The electronic document 302 is presented formatted for printing, and includes two printable pages 304 and 306 scrollable using a scroll bar 308 and thus represents a "print preview" type display as would be understood by those skilled in the art. The printable page 304 of FIG. 3 is formatted into two columns 310 and 312 thus proportionally compressing the size of individual components incorporated on the page and thereby increasing the amount of information that may be reproduced on a single printable page. Each of the columns 310 and 312 is divided into sections 314, each section 314 relating to a specific result 104 indicated from the search page of FIG. 1. The sections 314 are separated by first graphical dividers 316 inserted by the formatted document generator application. Each section 314 is divided into two portions 320 and 322 by means of a second graphical divider 318 also formed by a graphical object inserted by the formatted document generator application.

Figure 2A:
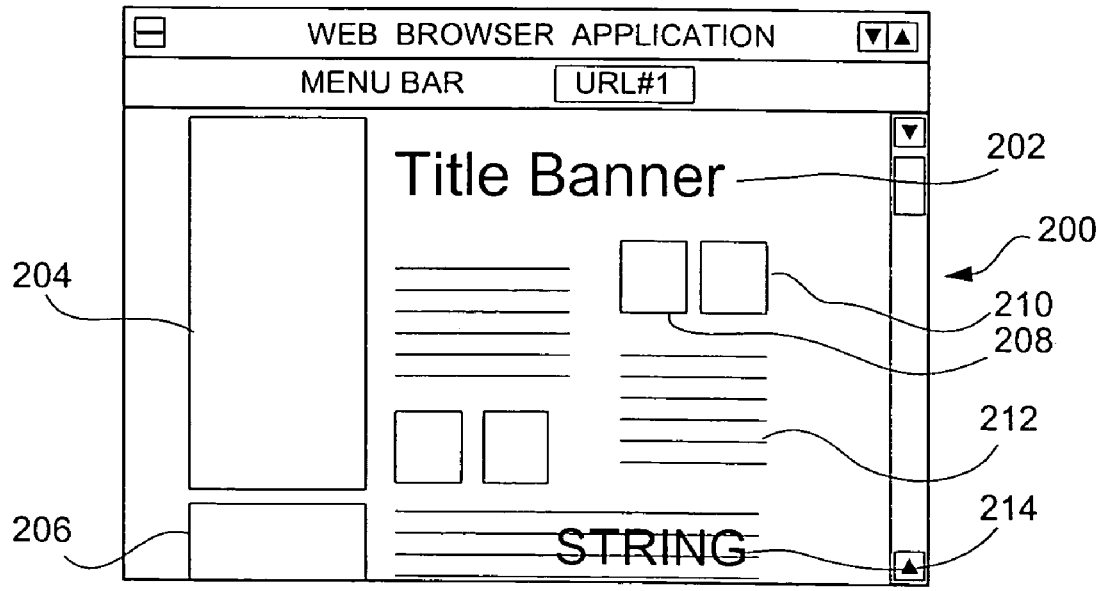
FIGS. 2A to 2C depict example pages that may be found through traditional examination of the search engine page of FIG. 1.

The first one 320 of the portions incorporates an extract of the top of the Web page associated with the URL of the corresponding search result. As seen, the top of the first column 310 of FIG. 3 corresponds with and replicates the top of the Web page shown in the display of FIG. 2A. This information is indicative of the context of the particular Web page provided at URL#1 and thus affords the user a context for the information contained in the search string 102. The portion 320 below the graphical divider 318 incorporates that portion of the Web page which includes the searched string 102 and thus provides the specific content relating to the string as it is found in that Web page. With respect to URL#1, this will be seen to be consistent with that substantially displayed in the arrangement of FIG. 2A.

This separation and presentation of information is more generically depicted in FIG. 3 with respect to URL#2 with respect to the top of the Web page context information being separated from the content information including the searched string.

Figure 2B:
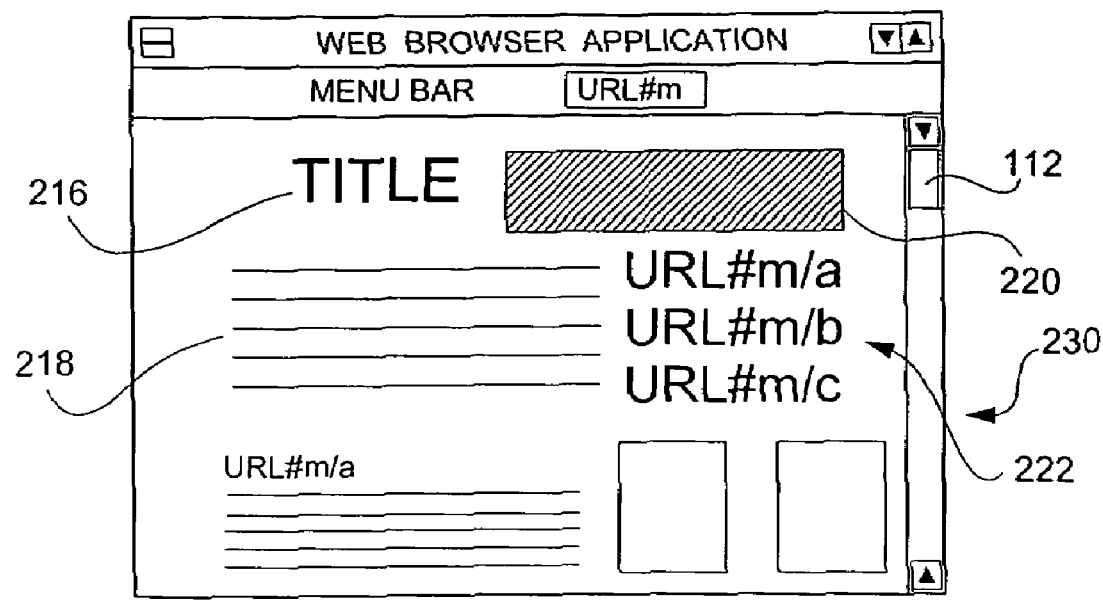
Figure 2C:
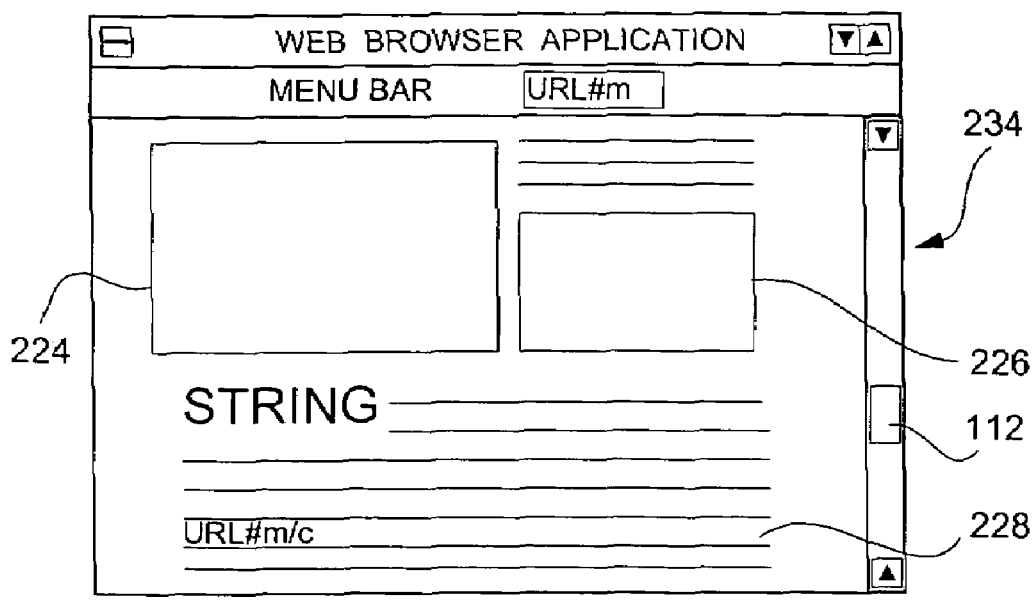

The example shown in FIG. 3 with reference to URL#m illustrates the specific power of the preferred embodiment in avoiding a need of the user to review and/or print the entire contents within any one search result URL location. As seen, the section relating to URL#m includes a contextual title and page corresponding to that shown in FIG. 2B, followed by a sectional divider 318 and a section corresponding to the information contained in FIG. 2C. Significantly, use of the formatted document generator application permits passing over, or skipping, those portions of the referenced location (in this case URL#M) that do not contain the searched string. In some situations, this can obviate the necessity to scroll through or print a single Web page that may occupy many display screens of information, which may also occupy many individual sheets of paper in a hard copy reproduction. The preferred embodiment acts to condense the particular information found at the location identified by the search result into a convenient, interpretable and manageable form.

As seen, the printable document 302 depicted in FIG. 3 incorporates information from a number of Web locations identified by the search result, the information being presented in a contextual form and also in a form in which the particular content relating to the search string is identified.

As also seen in FIG. 3, each of the portions 320 includes a reproduction 324 of the actual URL to which that portion relates thereby maintaining a record of the location of the referenced information. The portions 322 may also be configured to identify a similar location 326, but in this case, modified by the relative location within the referenced URL as to where the searched string is found. For example, for URL#1, the searched string is found on "page 1", representing the electronic screen page number corresponding to that seen in FIG. 2A. For URL#m, the page number is "page n", representing the number of electronic screens required to be conventionally scrolled by the user within URL#m in order to locate the searched string.

A permanent record may be obtained either by saving the electronically displayed printable document 302 to memory, for example by actuating a SAVE icon 324, or by printing the electronically displayed printable document, for example by actuating a PRINT icon 326.

According to the preferred embodiment, the printable document of FIG. 3 can be generated once the search engine results of FIG. 1 are returned to the user via the browser application. Generation of the printable page of FIG. 3 occurs as a result of the hypertext document collating and formatting, and without-additional burden upon the Web browser application or search engine, by directly and separately accessing the individual URLs returned by the search engine result and searching within each URL for the relevant searched string information. This method is depicted in the flow chart of FIG. 4.

Figure 4:
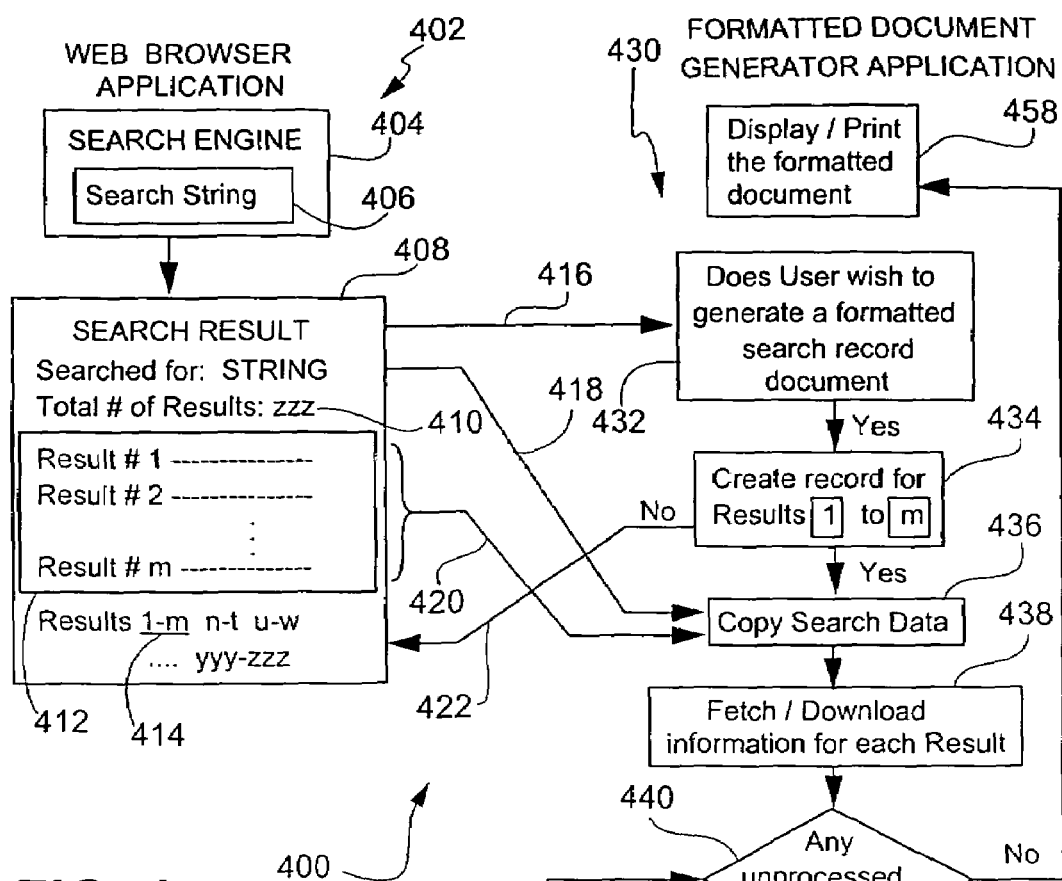
FIG. 4 is a flow chart depicting results collection and formatting according to the preferred embodiment.
Figure 4:
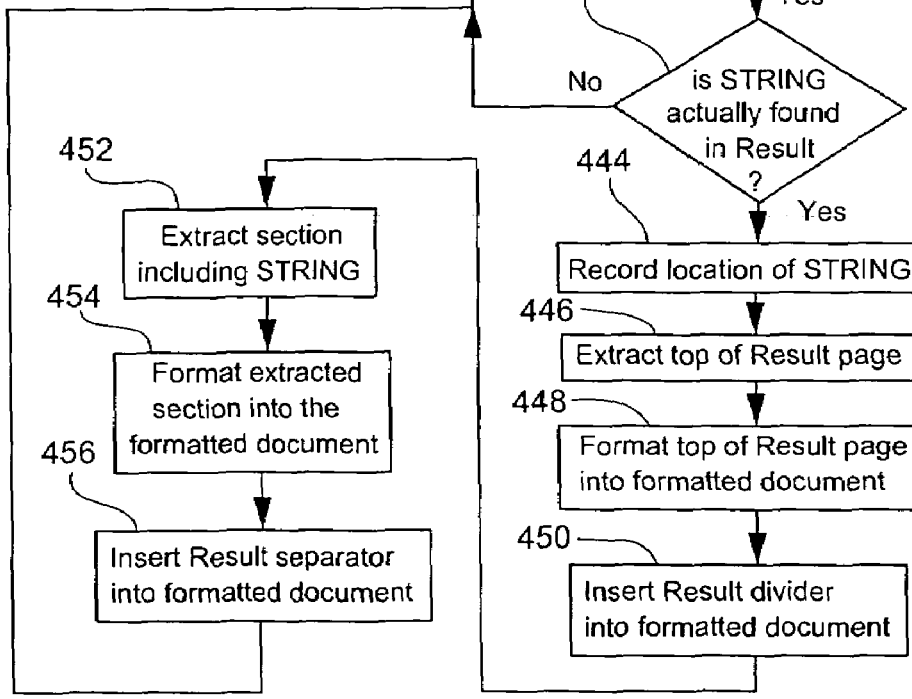

FIG. 4 depicts the operation 400 of a Web browser 402 and associated search engine 404 and their relationship to the operation of the formatted document generator application 430 according to the preferred embodiment. As seen, the browser 402 incorporates the search engine 404 which acts upon a search string 406 entered by the user. The search string 406 may be one or more words of text separated or associated using Boolean operators. The search engine 406 returns a search result 408, typically being an individual page displayed by the browser 402 and which traditionally replicates the searched string together with an indication of the total number of results 410 or hits identified by the search. The user is then able to select groups 414 of results typically based upon a ranked number which can be displayed on a page at any one time. As seen, results 412 incorporating Results # 1-m are displayed.

At this stage, the user may invoke the operation of the formatted document generator application 430 to create a printable document based upon the search result 412 indicated in the search page. If this is not desired, operation of the application 430 is not performed and the user is free to continue utilising the search engine 404 or browser 402 in a traditional fashion, for example by effecting a further search or directly examining any one of the search results 412. Hypertext document collating and formatting may be performed if such is desired.

Alternatively, and according to the preferred embodiment, where the user elects for the creation of a printable search result in step 432, step 434 checks that the printable document is to be formed for the displayed results, in this case, Results # 1-m. Where appropriate, the user may select, via an interconnection 422 to the search result 408, for another group 414 of the search results 412 to be selected. Once the group of results is settled in step 434, step 436 copies search information data including the searched string 406 via an interconnection 418, and the URL's corresponding to the selected group of results 412 via an interconnection 420.

The interconnections 416, 418, 420 and 422 shown in FIG. 4 will be appreciated a being illustrative of interactions between the applications 402 and 430, and those skilled in the art will appreciate that such may be implemented in various forms or procedures, not necessarily dependent on the individual "interconnections" as shown, any one of which may be optionally implemented. For example, interconnections 418 and 420 may be unitarily formed as a single request for search information, such as when the search information is derived from a file, the file for example being formed by batch processing of search engine calls.

In step 438 which follows, the generator application 430, independently of the browser 402 or search engine 406, fetches the data from the Web at the various URL's given by the individual results 412. Step 440 then commences a processing loop on the fetched/downloaded data, one result at a time. At this stage, a determination is made in step 440 as to whether or not there are any unprocessed results and, where there exist no are unprocessed results, step 442 follows. In step 442, examination is made of the fetched data of the particular result 412 to identify if the searched string 406 is actually found therein. In those cases where the string being searched is not found within the Web site, a situation which occurs all too frequently and much to the displeasure of Internet users, step 442 returns control to step 440 so as to process the next result. Where the searched string is found in step 442, step 444 follows which records the specific location of the search string 406 within the particular Web site.

Processing of the individual result location is then performed to format the search result. Next, in step 446, the top of the Web page for the result being processed is extracted from the fetched URL data. In step 448 this is converted from a hypertext format to a common format suitable for both electronic display and hard copy printing, and incorporated into a printable document. Step 450 which follows inserts a result divider, corresponding to the graphic 318 of FIG. 3, into the formatted document. Step 452 then uses the recorded location from step 444 to extract a particular section of the Web page that incorporates the searched string. In step 454 which follows, the extracted selection incorporating the searched string is formatted into the common displayable and printable form and incorporated into the printable document. This is followed by step 456 which inserts the location break, corresponding to the separator 316 of FIG. 3, into the printable document. Control then returns to step 440 for the processing of the next result. Where there are no further results to be processed, step 440 transfers control to step 458 which enables the user to view the printable document via a display screen in the fashion shown in FIG. 3, from which search results may be saved and/or printed by actuating an appropriate icon.

In an alternative implementation, steps 438, 442 and 444 may be combined into a single process where, as the data is fetched and downloaded from the Web, the data is simultaneously checked to identify the searched string, and where the searched string is identified, that specific location within the data is recorded. Where the searched string is not located in the URL accessed data, that data may be discarded, without further processing, so that data from the next URL in the search results list can be fetched.

According to the preferred embodiment, the formatted document generator application extracts only predetermined portions of each search result URL thus ensuring that the printable search result document 302 of FIG. 3 does not contain extraneous matter not necessarily related to the search. This avoids consuming inordinate computing resources for generation and reproduction of the printable document.

Once reproduced, by display or printing, the user may closely review the search result presented by the printable document 302 and thereafter access particular URLs that may be desired for closer examination and review. A traditionally formatted printable document may then be created for any closely examined URL, according to the principles of the Hypertext Document Collating Tool.

Where desired, the formatting performed in step 454 of the extracted section incorporating the searched string may be made in such a manner so as to highlight the particular search string as it appears with in the formatted document. In this fashion, any person reviewing the printable document of FIG. 3 either in its electronic or hard copy printed form, has their attention directed to the particular search string as it is reproduced.

It will be further appreciated that the purpose of the search is to identify the searched string, and thus the display of the extracted top of page for the result is not essential for the performing of the present invention since this is not necessarily important to the particular search result. However, the present inventors consider that the incorporation that such of page information is relevant so that the actual searched string as found is placed in some user interpretable context. For example, a search of the term "automobiles" may return results relating to the manufacturers of automobiles configured for use on the road. However, the same search may return a result for a manufacturer of toy or model automobiles suitable for the playing of children's games and the like. In many instances, the names of such automobiles and trade marks associated with such automobiles may be the same, irrespective of whether they are real automobiles or toy automobiles. The incorporation of the contextual top of page information will generally assist the user in distinguishing between toy motor vehicles and real motor vehicles.

The printable document generated according to the preferred embodiment may be arranged to extend over one or more printable pages which can be viewed via the display shown in FIG. 3 using the vertical scroll bar 308. Since the GUI display of FIG. 3 is a "print preview" type display, it has a fixed width and a horizontal scroll bar is not necessary. Further to the user's selectability of the display of the top part of each Web page, the preferred embodiment may be configured for the display of more than one section which incorporates the searched string, each such section for example being separated by replication of the graphic divider 318. For example, preferences may be established for reproducing a predetermined number of hits upon the search string and/or all of the hits on the search string.

Further, the amount of information reproduced relevant to any one hit on the searched string, and as a consequence of step 452, may be varied according to user preferences. By default, such may include a single displayable screen taken from a Web page incorporating the searched string. Alternatively, the entirety of the Web page at a particular location may be referenced. In a further alternative, where the text string forms part of a paragraph of text, only that paragraph or section of text need not be extracted for reproduction. In a further user selectable optimisation, because many images found on the Web are not directly reproducible in print, examples of which being animated GIF images and the like, the user may select disablement of such images in the printable document thereby permitting the formatted document generator application to reconfigure the printable document compared to the actual Web produced location so as to optimise the amount of text to be reproduced. Other image types, such as JPEG and static GIF images may be disabled from printing as desired. This may be important, particularly when handling "home pages", which represent a root directory URL. In such pages, and many others, user selectable icons and the like often consume much of the displayable page but often provide no substantive information, particularly in satisfying a search query. Appropriate configuration of the formatted document generator, can permit such icons and like objects to be excluded from the printable document, thus affording greater levels of compaction of information relevant to the searched string in the printable document.

As a consequence, the printable document 302 of FIG. 3 and method of FIG. 4, permit network obtained search results to be automatically formatted and collated into a single, user interpretable, document that provides for compaction of more than one, and typically numerous, summaries of each search result on any single printable page. The embodiment also provides a permanent record of the search and search results in a convenient and compact form. Significantly, the information is presented to the user in the same manner that such would be seen had the user actually accessed the referenced URL in the traditional fashion, thus ensuring maintenance of the context of the referenced URL and the searched string to the user. This is to be contrasted with prior art search result presentations such as FIG. 1, which are not configured to reproduce graphics, images and other indicia that provide user interpretable context to the search result. Prior art search result presentations typically carry little or no information of the searched string.

Figure 5:
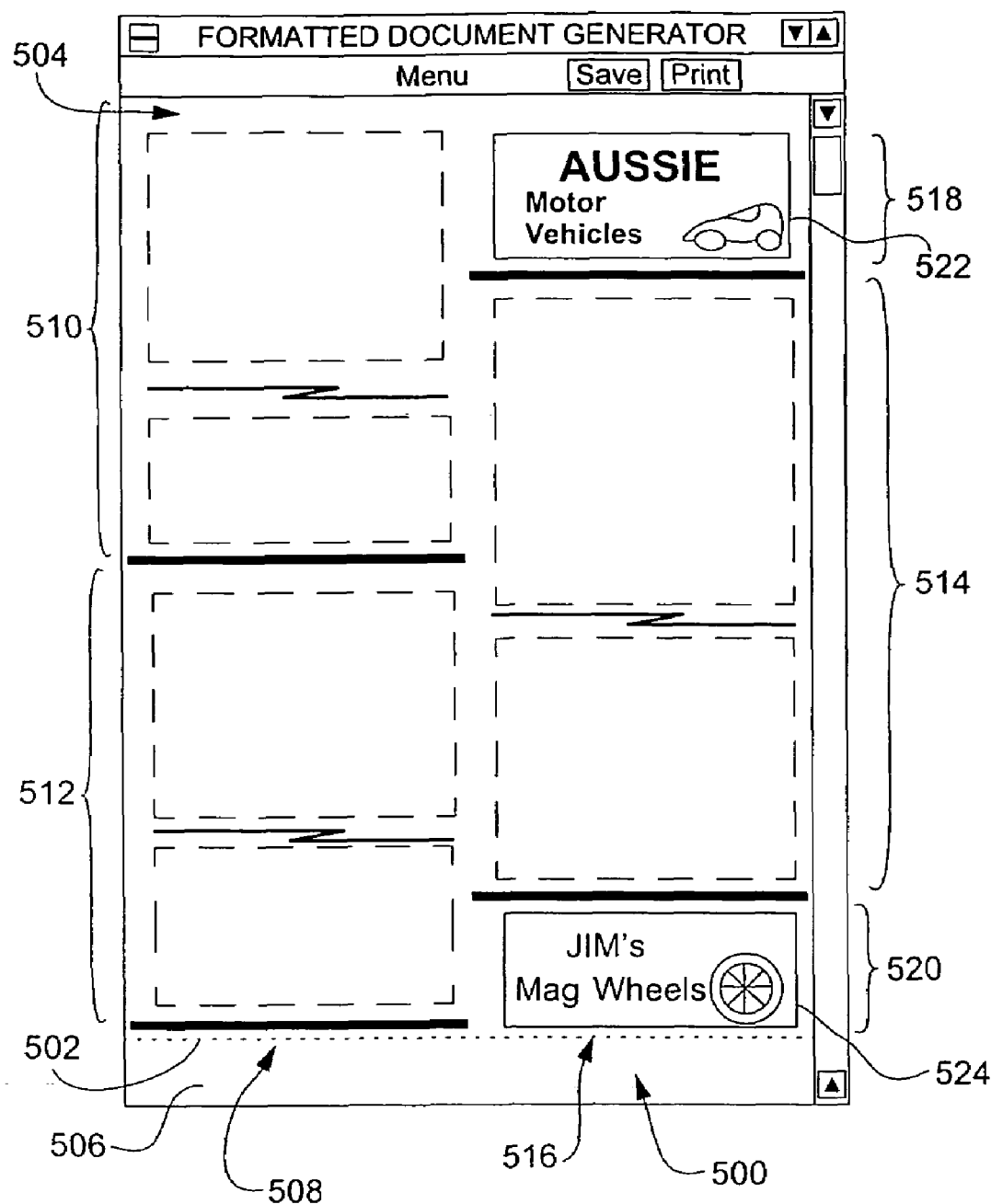
FIG. 5 is a schematic illustration of a network traversal page according to another embodiment.

A further embodiment is illustrated in FIG. 5 where a further printable page is illustrated as part of a GUI incorporating sections configured according to the previous embodiment.

As will be appreciated by those skilled in the art, automated collating and formatting of the printable documents of FIG. 3 can result in the content of any printable column or page extending to a further column or page thus causing the printable document to be somewhat non-contiguous. Whilst such may be often tolerated, where the document is segmented in the fashion shown in FIG. 3, it may be desirable for each individual segment to be formed in a single column upon a single page. Such can result in the creation of vacant spaces at the end of columns into which no specific information may be placed due to size limitations. As seen from FIG. 3, such vacant space appears at the bottom of the column 312.

According to the further embodiment of FIG. 5, such vacant spaces may be occupied through the insertion of a printable message such as an advertisement. The message or advertisement may be inserted by a server associated with the generation of the printable document and/or the information contained therein. In a preferred implementation, as seen in FIG. 5 where a printable document 500 generated is formed from search results according to the embodiment of FIG. 3, the printable document 500 includes a page break 502 separating a first printable page 504 from a second printable page 506, and a first column 508 into which are neatly placed two search result sections 510 and 512. However, in this example, the search result returns only one further result 514 which does not occupy the entirety of a second column 516 of the is page 504, leaving spaces 518 and 520 respectively at the top and bottom of the column 516. According to the present embodiment, advertisements are sourced based upon the subject matter being searched, in a manner consistent with traditional electronic advertisements that can occur during Web browsing sessions, the sourced advertisements being formatted into a printable form and inserted into the spaces 518 and 520. However, unlike such traditional Internet advertisements, which are configured for transient display upon an electronic display (eg. video screen), advertisements of the present embodiment are intended ultimately for reproduction by means of printing and, as a consequence, are specifically configured for such display and will therefore, for example, be absent animated graphical objects or other moving components. The data format of such message is therefore preferably common to that used in sections 510 and 512.

Using the foregoing example, where the user searches the string "automobile", an advertisement 522 may be placed in the space 518 advertising "AUSSIE Motor Vehicles" in the manner illustrated in FIG. 5. Another advertisement 524, for example relating to automobile parts such as those manufactured by "JIM's Mag Wheels", may be inserted into the otherwise vacant space 520.

According to the present embodiment, one or more of the printable messages or advertisements may be returned to the formatted document generator in a number of ways. Firstly, this may be by way of the particular search engine being used to conduct the search on the string which traditionally returns electronic messages for display of the video screen of the user. Any such returned advertisement may then be interpreted by the formatted document generator which then converts into a printable form suitable for formatting and placement into the printable document of FIG. 5. This method, and another, may be described with reference to FIG. 6.

Figure 6:
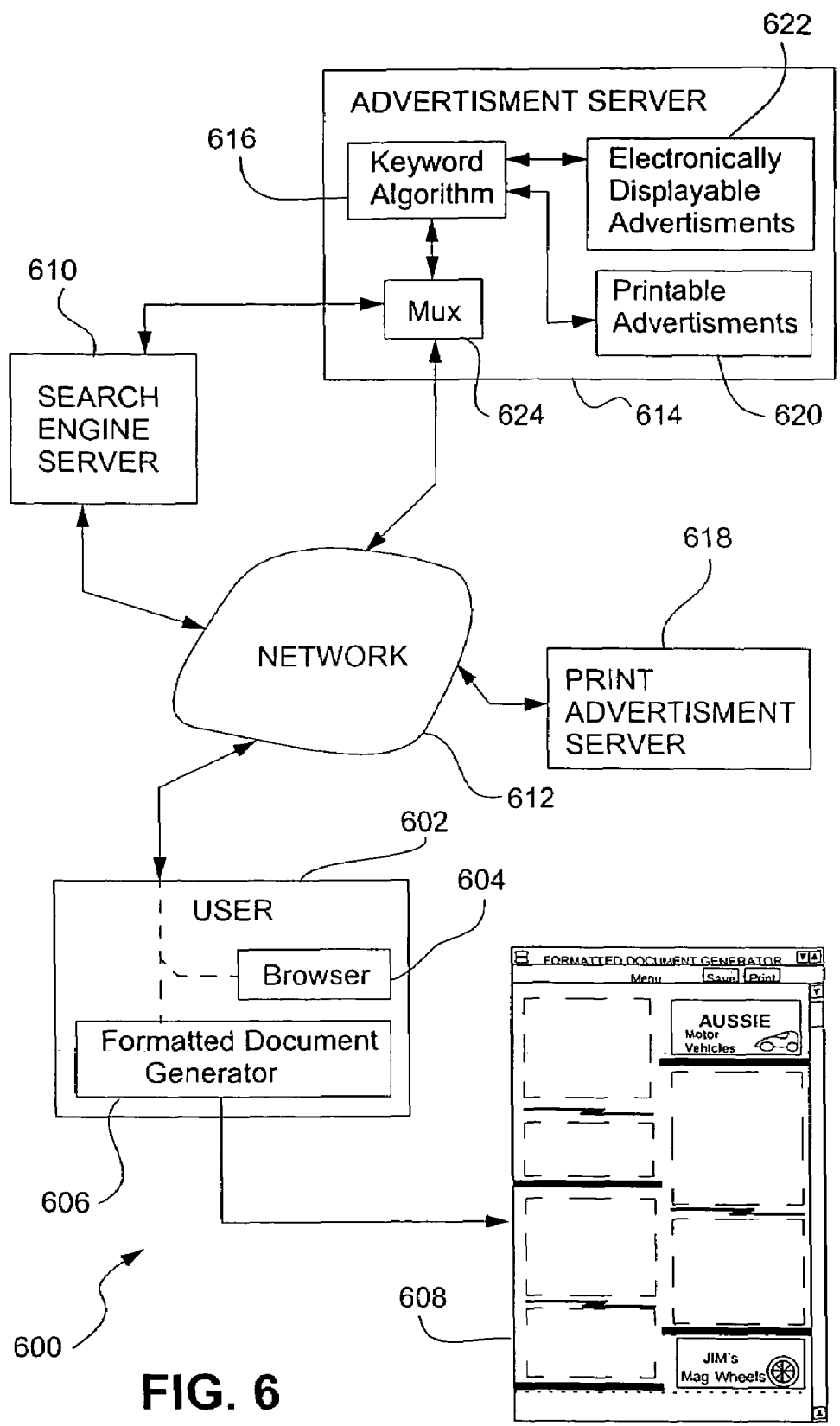
FIG. 6 is a flow diagram depicting generation of the arrangement shown in FIG. 5.

FIG. 6 shows a system 600 in which a user 602 operates a Web browser application 604 together with a formatted document generator application 606. The user 602 accesses a search engine server 610 via a network 612 in order to identify information available via the network 612. The search engine 610 is associated with an advertisement server 614 which includes a keyword algorithm interpreter 616 for examining the user's search string to thereby return an appropriate electronically displayable advertisement 622 via the search engine server 610 to the user 602. The formatted document generator 606 then interprets the advertisement and formats the advertisement into a form suitable for electronic printing by depositing the same into an electronic printable document 608, which, as will be observed, corresponds to the representation of FIG. 5.

In an alternative, the formatted document generator 606, having identified the need for the placement of an advertisement to fill the vacant column space, is configured to communicate via the network 612, without interaction with the browser 604 or search engine server 610, with a dedicated print advertisement server 618 for the provision of a printable advertisement to the formatted document generator 606. The print advertisement server 618 is configured in a fashion to examine the network 612, for example including the advertisement server 614 and/or itself, to identify one or more printable advertisements 620 to be automatically returned, preferably via the server 618, to the formatted document generator 606. In this fashion, rather than relying upon the search engine server 610 for the presentation of advertisements, the formatted document generator 606 may call the dedicated server 618 to provide advertisements specifically configured for reproduction by both display and printing. In this fashion, the formatted document generator 606 either directly, or via the server 618, may control those advertisements that may be placed into the otherwise blank spaces 518 or 520 of the document 500. Such an arrangement, where calls are made via the server 618, permits monitoring of advertisements returned for printing in the document 608.

A specific advantage of incorporating the printable advertisements in the printable document is that the printable document can become a permanent record of the user's search of the Web that may be required for later review. As a consequence, the advertisement that is printed with the search result also becomes a permanent record of the advertisement and thus can be interpreted as being substantially more valuable in an advertising sense than a transient advertisement, such as those traditionally displayed on electronic display apparatus via the search engine server 610 as will be known to those skilled in the art. As a consequence, the individual printable advertisements can be provided at a premium cost compared to those transient advertisements. Further, where the formatted document generator 606 interacts with the server 618 for accessing the printable advertisements 620, the dedicated server 618 may be configured for direct management of costs associated with advertising charges associated with providing the printable advertisement 620 to the user 602 for incorporation into the printable document 608.

Figure 7:
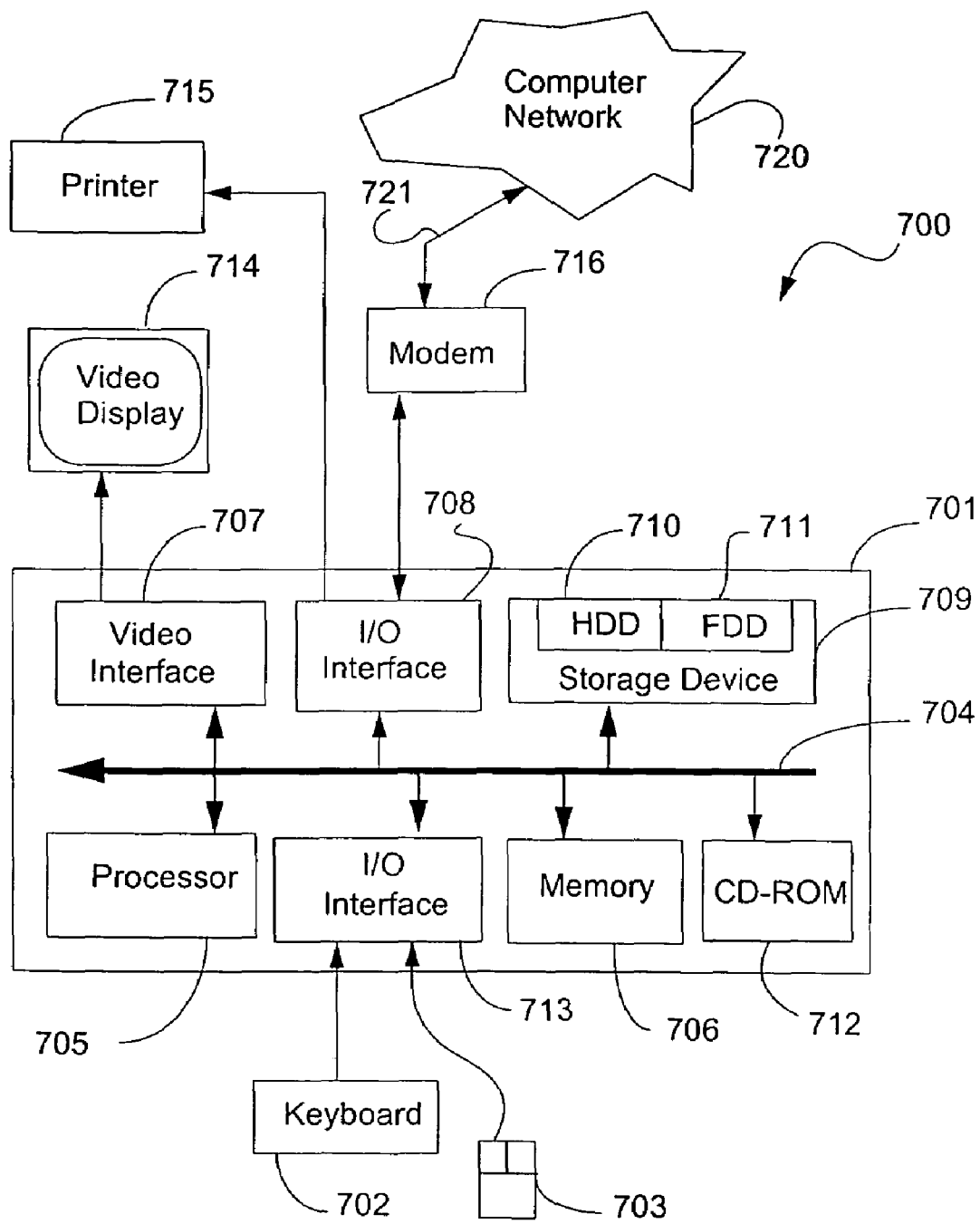
FIG. 7 is a schematic block diagram representation of a computer system in which the preferred embodiments may be implemented.

Formatted document generation described with reference to FIGS. 3 to 6 is preferably practiced using a conventional general-purpose computer system 700, such as that shown in FIG. 7 wherein the processes of FIGS. 4 and 6 and the Hypertext Document Collating Tool may be implemented as software, such as an application program executing within the computer system 700. In particular, the steps of the methods of FIGS. 3 to 6 are effected by instructions in the software that are carried out by the computer. The software may be divided into two separate parts; one part for carrying out the methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for formatted document generation in accordance with the embodiments of the invention.

The computer system 700 comprises a computer module 701, input devices such as a keyboard 702 and mouse 703, output devices including a printer 715 and a display device 714. The display 714 is used to reproduce the GUI and images depicted in FIGS. 1, 2A-2C, 3 and 5, whilst the printer 715 may be used to print the printable documents 300 and 500 of FIGS. 3 and 5 respectively. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN).

The computer module 701 typically includes at least one processor unit 705, a memory unit 706, for example formed from semiconductor random access memory (RAM) and read only memory (ROM), input/output (I/O) interfaces including a video interface 707, and an I/O interface 713 for the keyboard 702 and mouse 703 and optionally a joystick (not illustrated), and an interface 708 for the modem 716. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the embodiments can be practiced include IBM-PC's and compatibles, Sun Sparcstations or alike computer systems evolved therefrom.

Typically, the application program of the described embodiments is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable medium including magnetic tape, a ROM or integrated circuit, a magneto-optical disk, a radio or infra-red transmission channel between the computer module 701 and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.

The methods of the described embodiments may alternatively be implemented in dedicated hardware such as one or more integrated circuits performing one or more functions or sub-functions of the formatted document generator. Such dedicated hardware may include graphic processors, digital signal processors, or one or more microprocessors and associated memories.

INDUSTRIAL APPLICABILITY

Embodiments of the present invention are applicable to network data accessing and retrieval systems and the described embodiments are intended to complement existing browsing and searching tools, particularly in Internet and World Wide Web applications. It is also noted that the embodiment of FIGS. 5 and 6 is not limited to for use with the embodiment of FIGS. 3 and 4, but finds general application for use with the Hypertext Document Collating Tool, and also in like arrangements. Further, whilst the embodiment of FIGS. 3 and 4 describes an arrangement that is adjunct to the search engine application, an alternative embodiment may be integrated into the search engine application so as to automatically supplement or replace, the provision of search results as depicted in FIG. 1. For example, the search engine may be configured to generate a file which incorporates the search string, the URL's returned in the search result, and user preferences for the formatted document generation. Such preferences may include the number of URL's to be examined for any one search result (eg. the first ten), the amount of information to be extracted from any referenced URL (eg. the top of page, the number of hits on the searched string, the size of the extracted string containing portion), and a maximum size to (eg. in terms of printable pages) of the printable document for any one searched string, to name but a few. The provision of such a file, and appropriate configuration of the formatted document generator application to interpret the file, can facilitate the batch processing of search strings and corresponding document generation without user interaction.

Further, with respect to the embodiments of FIGS. 5 and 6, rather than being arranged within columns, the advertisements 522 and/or 524 may be arranged to extend across the width of the page, for example like a "banner" style advertisement.

Also, whilst the embodiment of FIGS. 3 and 4 has been described with reference to Internet and World Wide Web searching, the inventive concept is not limited thereto, but applies generally to all computer networks. For example, a Local Area Network within an office environment may incorporate many thousands of word processing documents distributed amongst many computer devices. The described embodiments may thus be used to perform keyword searching on such documents in order to identify specific classes of documents without the user having top open each individual document.

The foregoing describes only some embodiments of the present invention, and modifications and/or changes can be made thereto without departing from the scope and spirit of the invention, the embodiments being illustrative and not restrictive.

The invention claimed is:

1. A method of presenting search results obtained from a search conducted over a computer network, the search being performed using searching criteria and returning information including a network location corresponding to each search result, said method comprising the steps of:
- (a) fetching data associated with the network location corresponding to one of the search results;
- (b) examining the fetched data to identify therein the searching criteria to provide at least one specific location within the fetched data of the searching criteria;
- (c) using the one specific location to identify a portion of the fetched data including at least the searching criteria;
- (d) formatting a document, said formatting comprising:
  - (da) formatting the portion including the searching criteria into the document, to present the portion in the same manner as if presented within the entirety of the fetched data, the portion being formatted so that the searching criteria in the formatted portion becomes distinguishable in the formatted portion from other parts of the formatted portion; and
  - (db) formatting root data, which is obtained from the fetched data at a root location of the corresponding network location, into the document in association with the formatted portion, wherein the formatted root data provides a context for the formatted portion and can be formatted independently of an entire content of the network location; and
- (e) repeating steps (a) to (d) for each remaining search result in which step (d) incorporates the corresponding formatted portion into the document.

2. A method according to claim 1, wherein step (d) comprises incorporating graphical separators into the formatted document to separate the portions of fetched data from different ones of the network locations.

3. A method according to claim 1, wherein step (d) further comprises incorporating graphical separators into the formatted document to separate the corresponding portion from the root data of the corresponding network location.

4. A method according to claim 1, wherein the document is formatted into a plurality of columns.

5. A method according to claim 1, comprising the further step of:
- (f) electronically displaying the document to an instigator of the search.

6. A method according to claim 5, comprising the further step of:
- (h) printing the electronically displayed document.

7. A method according to claim 1, wherein the portion is formatted into the document in a print preview format.

8. A method according to claim 1, comprising the further step of:
- (g) printing the document.

9. A method according to claim 1, wherein the fetched data is of a plurality of data types, and the formatting converts the data types into a common data type suitable for each of electronic display and printing.

10. A method according to claim 1, wherein the formatting of step (d) comprises adjusting a reproducible size of the portion.

11. A method of formatting an electronic document intended for reproduction by printing, said method comprising the steps of:
- (a) obtaining, from a searching process, location information within a computer network of at least one search result returned by the searching process;
- (b) using the location information to fetch and store document data from the computer network relating to each search result, the document data including at least a portion incorporating the searching criteria used to instigate the searching process; and
- (c) formatting a printable electronic document, said formatting comprising:
  - (c-i) formatting the document data including at least the portion into the printable electronic document to thereby reproduce the portion in the printable electronic document in the same manner as if presented within the entirety of the document data, wherein the document data is formatted so that the searching criteria in the formatted portion becomes distinguishable in the formatted portion from other parts of the formatted portion; and
  - (c-ii) formatting root data which is obtained from the document data at a root location of the corresponding network location, into the printable electronic document in association with the formatted portion, wherein the formatted root data provides a context for the formatted portion and can be formatted independently of an entire content of the network location.

12. A method according to claim 11, wherein step (b) comprises, for each search result, the sub-steps of:
- (ba) using the corresponding location information to fetch and store all document data accessible for the search result;
- (bb) checking the stored document data to identify the searching criteria therein; and
- (bc) recording, for each identification of the searching criteria, a specific location of the searching criteria within the stored document data.

13. A method according to claim 12, wherein step (b) comprises, for each search result, the further sequential step of:
- (bd) discarding the stored document data for the search result where the searching criteria is not at least once identified therein in a reproducible context.

14. A method according to claim 11, wherein step (c-i) comprises, for each search result, the sub-steps of:
- (ca) identifying at least one portion of the stored document data associated with at least one reproducible occurrence of the searching criteria;
- (cb) converting the identified one portion to a data format suitable for both electronic display and printing; and
- (cc) incorporating the converted identified one portion into the electronic document according to a predetermined format to thereby reproduce the content and context of the searching criteria.

15. A method according to claim 14, wherein step (cii) comprises, for each search result, the further sub-steps of:
- (cd) identifying an initial portion of the stored document data arranged at a root of the location information; and
- (ce) converting the initial portion to the predetermined format;

wherein step (cc) comprises incorporating the converted initial portion and the converted identified one portion into the printable electronic document.

16. A computer network browsing application comprising code operable to perform the method of claim 1 or claim 11.

17. A document formed according to the method of claim 1 or claim 11.

18. Apparatus configured to form a document according to claim 17.

19. Apparatus for presenting search results obtained from a search conducted over a computer network, said search being performed using searching criteria and returning information including a plurality of network locations, said apparatus comprising:

means for fetching document data associated with network location corresponding to one of the search results;

means for examining said fetched data to identify therein said searching criteria to provide at least one specific location within said fetched data of said searching criteria;

means for using said one specific location to identify a portion of the fetched data including at least said searching criteria; and means for formatting comprising first means for formatting said portion including the searching criteria into a document, to present the portion in the same manner as if presented within the entirety of the fetched data, wherein the portion is formatted so that the searching criteria in the formatted portion becomes distinguishable in the formatted portion from other parts of the formatted portion, and second means for formatting root data, which is obtained from the fetched data at a root location of the network location, into the document in association with the formatted portion, wherein the formatted root data provides a context for the formatted portion and can be formatted independently of an entire content of the network location.

20. Apparatus according to claim 19, wherein said means for formatting incorporates graphical separators into said formatted document to separate the portions of fetched data from corresponding different ones of said network locations, whereby portion is formatted into the document in a print preview format.

21. Apparatus according to claim 19, wherein said document is formatted into a plurality of columns.

22. Apparatus according to claim 19, further comprising:
  a display device for displaying the document to an instigator of said search; and
  a printer for printing said document.

23. Apparatus for formatting an electronic document intended for reproduction by printing, said apparatus comprising:

means for obtaining from a searching process location information within a computer network of at least one search result returned by said searching process;

means for using said location information to fetch and store document data from said computer network relating to each said search result, said document data including at least a portion incorporating the searching criteria used to instigate said searching process; and means for formatting in a print preview format at least the portion into a printable electronic document to thereby reproduce the portion in the printable electronic document in the same manner as if presented within the entirety of the document data, wherein the document data is formatted so that the searching criteria in the formatted portion becomes distinguishable in the formatted portion from other parts of the formatted portion, said means for formatting further formatting root data, which is obtained from the document data at a root location of the corresponding network location, into the printable electronic document in association with the formatted portion, wherein the formatted root data provides a context for the formatted portion and can be formatted independently of an entire content of the network location.

24. A computer readable medium, having a program recorded thereon, where the program is configured to make a computer execute a procedure to present search results obtained from a search conducted over a computer network, said search being performed using searching criteria and returning information including network location corresponding to each search result, said program comprising:

code for fetching document data associated with the network location corresponding to one of the search results;

code for examining said fetched data to identify therein said searching criteria to provide at least one specific location within said fetched data of said searching criteria;

code for using said one specific location to identify a portion of the fetched data, including at least said searching criteria; and code for formatting comprising:

first code for formatting said portion including the searching criteria into a document, to present the portion in the same manner as if presented within the entirety of the fetched data, wherein the portion is formatted so that the searching criteria in the formatted portion becomes distinguishable in the formatted portion from other parts of the formatted portion; and second code for formatting root data, which is obtained from the fetched data at a root location of the corresponding network location, into the document in association with the formatted portion, wherein the formatted root data provides a context for the formatted portion and can be formatted independently of an entire content of the network location.

25. A computer readable medium according to claim 24, wherein said program further comprises code for repeating operation of said program for each remaining said network location, and said code for formatting incorporates the corresponding portion into the document in a print preview format.

26. A computer readable medium according to claim 24, wherein said formatting comprises incorporating graphical separators into said formatted document to separate portions of fetched data from corresponding different ones of said network locations.

27. A computer readable medium according to claim 24, wherein code for formatting further comprises code for incorporating graphical separators into said formatted document to separate said corresponding formatted portion from said formatted root data of one said network location.

28. A computer readable medium according to claim 24, wherein said document is formatted into a plurality of columns.

29. A computer readable medium according to claim 24, wherein said fetched data is of a plurality of data types, and said formatting converts said data types into a common data type suitable for each of electronic display and printing.

30. A computer readable medium, having a program recorded thereon, where the program is configured to make a computer execute a procedure to format an electronic document intended for reproduction by printing, said program comprising the steps of:

code for obtaining from a searching process location information within a computer network of at least one search result returned by said searching process;

code for using said location information to fetch and store document data from said computer network relating to each said search result, said document data including at least a portion incorporating searching criteria used to instigate said searching process; and code for formatting a printable electronic document comprising:

first sub-code for formatting the document data including at least the portion into the printable electronic document to thereby reproduce the portion in the printable electronic document in the same manner as if presented within the entirety of the document data, wherein the document data is formatted so that the searching criteria in the formatted portion becomes distinguishable in the formatted portion from another part of the formatted portion; and second sub-code for formatting root data, which is obtained from the document data at a root location of the corresponding network location, into the document in association with the formatted portion, wherein the formatted root data provides a context for the formatted portion and can be formatted independently of an entire content of the network location.

31. A computer readable medium according to claim 30, wherein said code for using comprises:

sub-code for using the corresponding location information to fetch and store all document data accessible for said search result;

sub-code for checking said stored document data to identify said searching criteria therein; and sub-code for recording, for each identification of said searching criteria, a specific location of said searching criteria within said stored document data, each said sub-code being operable for each said search result.

32. A computer readable medium according to claim 31, wherein, for each said search result, said code for formatting comprises:

sub-code for identifying at least one portion of said stored document data associated with at least one reproducible occurrence of said searching criteria using said specific location;

sub-code for converting said identified one portion to a data format suitable for both electronic display and printing; and sub-code for incorporating said converted identified one portion into said electronic document according to a predetermined format for each said search result, each said sub-code being operable for each said search result.

33. A computer readable medium according to claim 31, wherein said code for using further comprises:

sub-code for discarding said stored document data for said search result where said searching criteria is not at least once identified therein in a reproducible context.

34. A computer readable medium according to claim 30, wherein said code for formatting comprises:

sub-code for identifying at least one portion of said stored document data associated with at least one reproducible occurrence of said searching criteria;

sub-code for converting said identified one portion to a data format suitable for both electronic display and printing; and sub-code for incorporating said converted identified one portion into said electronic document according to a predetermined format for each said search result, each said sub-code being operable for each said search result.

35. A computer readable medium according to claim 34, wherein said second sub-code for formatting further comprises:

sub-code for identifying an initial portion of said stored document data arranged at a root of said location information; and sub-code for converting said initial portion to said predetermined format;

wherein said sub-code for incorporating is operable to incorporate said converted initial portion and said converted identified one portion into said electronic document.

\* \* \* \* \*